United States Patent [19]
Dumsha

[11] Patent Number: 5,287,397
[45] Date of Patent: Feb. 15, 1994

[54] RADIOGRAPH EMBOSSER

[76] Inventor: Thomas C. Dumsha, 1 Nayborly Ct., Catonsville, Md. 21228

[21] Appl. No.: 26,747

[22] Filed: Mar. 5, 1993

[51] Int. Cl.$^5$ ............................................. B26F 1/00
[52] U.S. Cl. ................................ 378/162; 378/165; 30/363
[58] Field of Search .............. 378/162, 163, 164, 165; 30/364, 358, 363

[56] References Cited

U.S. PATENT DOCUMENTS

| | | | |
|---|---|---|---|
| 5,067,242 | 11/1991 | Singer | 30/364 |
| 5,166,967 | 11/1992 | Fabian | 378/163 |
| 5,202,911 | 4/1993 | Fabian | 378/163 |

Primary Examiner—David P. Porta
Attorney, Agent, or Firm—Walter G. Finch

[57] ABSTRACT

The present invention is an apparatus for identifying dental x-ray films that allows a health practitioner or staff member to permanently emboss identifying indicia directly on to a patient's x-ray films. The device is portable and lightweight. Constructed from a plastic or PVC material, it is impervious to x-ray film fixer or developer, as well as the emulsion used on x-ray film. The device is unique in that it neither etches nor destroys the emulsion on the x-ray film.

11 Claims, 2 Drawing Sheets

RADIOGRAPH EMBOSSER

BACKGROUND OF THE INVENTION

This invention relates to improvements in devices used to used to label radiographs (otherwise known as x-rays), and more particularly, to an embosser which may be used to permanently label dental radiographs.

Numerous methods and devices have been employed in an attempt to label x-ray film with specific information. These methods include labeling the films with an ink or other permanent dye, utilizing lead letters and numbers placed on to the film during exposure, and etching directly on to the remaining emulsion on the x-ray film. These methods not only tend to be cumbersome, but also take more time and skill than is necessary.

In dentistry, in particular, the use of small (mouth size) radiographic film is essential. The general dentist may expose up to twenty films on any given patient, thereafter placing the films in a radiographic holder and labeling them. However, due to the fact that more than one office personnel often handles the films, they are sometimes either misplaced or attached to the wrong chart. These radiographs are later discovered in different charts or in the dark room hours, and sometimes, days after the patient has left the office. Although these x-ray films are not technically lost, they are no longer of diagnostic value because of the difficulty in correctly matching them to their corresponding patients.

Endodontics, a specific branch of dentistry concerned with diseases of the tooth pulp, depends on radiographs for significant amounts of information during the course of therapy. Many times, two sets of radiographs are exposed so that the referring dentist as well as the endodontist can each keep a copy of the x-rays for his or her own records. Again, the radiographs may be handled by several personnel in each dental office before reaching their destination in the patient's chart.

The loss of developed x-ray films, as well as the inability to correctly identify the same, usually results in additional and unnecessary patient radiographic exposure. This is due to the fact that, when old x-rays are lost or misplaced, new x-rays are generally taken in order to provide the practitioner with the complete information that he or she needs in order to treat his or her patients.

BEST KNOWN PRIOR ART

The best known prior U.S. art is as follows:
U.S. Pat. No. 1,678,038
U.S. Pat. No. 2,837,658
U.S. Pat. No. 2,939,958
U.S. Pat. No. 4,194,122
U.S. Pat. No. 4,274,006
U.S. Pat. No. 4,429,412
U.S. Pat. No. 4,529,635
U.S. Pat. No. 5,034,974
U.S. Pat. No. 5,067,242
U.S. Pat. No. 5,115,461
U.S. Pat. No. 5,127,031

The prior art accounts for improvements in many devices which assist in identifying radiographs. Some of these prior inventions attempt to mark radiographs by means of light exposure to typewritten or printed indicia on labels adjacent to the radiographic film. The U.S. Pat. Nos. 5,034,974 and 5,127,031, both issued to Yurosko, use an indicia card with the patient's information and an identification camera to produce markings on x-ray film. The Eaton U.S. Pat. No. 1,678,038 teaches a similar method of marking x-ray films which incorporates light exposure to a section of a film covered on both sides with paper having identifying characters written thereon.

Other previous inventions, which attempt to mark radiographs with pertinent information, use x-ray opaque materials (such as lead) to produce visible markings. A lead backed embossing tape which may be attached to the surface to be radiographed is the subject of the U.S. Pat. No. 4,529,635. The Kranz et al. U.S. Pat. No. 5,115,461 discusses an x-ray label composed of a substrate transparent to x-ray radiation and an x-ray absorbing pigment deposited on the substrate (for providing images on the film). The x-ray absorbing pigment is preferably deposited on the film using a thermal process which eliminates the need for manual placement or embossing of characters. The U.S. Pat. No. 2,939,958 issued to Andersson describes a blank usable as both a printing plate and as an identifying plate for x-ray photography. The blank, composed of a base layer of hard, x-ray permeable material and a thinner layer of soft, x-ray impermeable material, allows x-ray radiation to pass through locally reduced areas corresponding to embossings. The Caine U.S. Pat. No. 4,274,006 introduces a universal x-ray film marker formed from tapered lead recesses which provides for crisper identification of characters on the film.

Other devices in the art which use x-ray impenetrable materials to mark film further include the Mitchell et al. U.S. Pat. No. 4,194,122, which teaches an x-ray film marking device comprising lead characters supported on a transparent sheet. An X-ray film marking apparatus which includes a thin metal plate having raised indicia, and therefore varying opacity to x-ray radiation, is the subject of the Limbach U.S. Pat. No. 2,837,658. The Pierce et al. U.S. Pat. No. 4,429,412 discusses an x-ray film marker comprising a film support means and a dial which may be used to selectively rotate indicia opaque to x-rays into the x-ray path, thereby properly labeling the corresponding film. The indicia in the Pierce et al. invention are visible through a window.

Though these devices have greatly improved the accuracy associated with marking radiographic films, they remain unnecessarily complicated for the task at hand. Therefore, the art lacks a simplified device which may be used to emboss identifying indicia directly on to radiographic film.

The prior art does, however, include numerous embossing devices. One such embosser is discussed in the U.S. Pat. No. 5,067,242 issued to Singer. The Singer device, a multiple design punch and embosser, comprises a lower base and an upper handle, the handle being both pivotally connected to the base and spring biased to an open position. Yet, the art does not account for a marking device whose design is specifically geared towards embossing radiographic films, and more particularly, towards embossing dental x-ray films.

SUMMARY OF THE INVENTION

The present invention seeks to provide a portable, lightweight, mechanical device which allows a health professional or associate staff member to permanently emboss dental and/or medical radiographs with pertinent patient information such as the patient's initials and the month/year of radiographic exposure.

The device is constructed from a lightweight plastic or PVC type material which is both durable in nature and impervious to chemicals such as x-ray film fixer or developer, or the emulsion used on the x-ray. The device consists of an upper handle member pivotally connected to a lower base member. The upper handle member is spring biased to an open position, and upon pressure, is brought in planar contact with the lower base member.

The upper handle member has four dials which allow the user to select the appropriate indicia in order to correctly identify the patient being radiographed, as well as the date of exposure. The lower base member has a number of guiding slots arranged on vertically offset horizontal planes. This latter feature allows for a number of radiographic films to be fed into the embossing device without interfering with one another.

The device is unique in that it neither destroys or etches the radiograph. Also, by enabling the films to be embossed after they have been developed, the device eliminates the possibility of loss of radiographic anatomical detail essential to the practitioner.

OBJECTS OF THE INVENTION

It is an object of this invention to provide a radiograph embosser for use by a health practitioner or other staff member.

Another object of this invention is to provide a novel, portable radiograph embosser which is constructed from a lightweight, chemical resistant material.

Still another object of this invention is to provide a novel radiograph embosser which neither destroys nor etches the radiograph.

To provide a unique radiograph embosser which has a lower base member and an upper, pivoting handle member is another object of this invention.

To provide a novel radiograph embossing device which has an upper handle member complete with a number of indicia dials and viewing windows, and a lower base member complete with a number of guiding slots arranged on vertically offset horizontal planes is still another object of this invention.

And to provide a novel radiograph embosser which is easy to use and simple in design is yet another object of this invention.

To provide a novel radiograph embosser with a lower member which has an embossers plate in lieu of wheels so the upper member can be pressed into the bottom plate which will result in an embosser X-ray is still another object of this invention.

To provide a novel radiograph embosser which can also be linked to a computer keyboard for entering the data in lieu of rotary dials which are manipulated by hand, is another object of this invention.

BRIEF DESCRIPTION OF THE DRAWINGS

These and other attendant advantages of this invention will become more obvious and apparent from the following detailed specification and accompanying drawings in which.

DESCRIPTION OF THE PREFERRED EMBODIMENTS OF INVENTION

Figure 1:
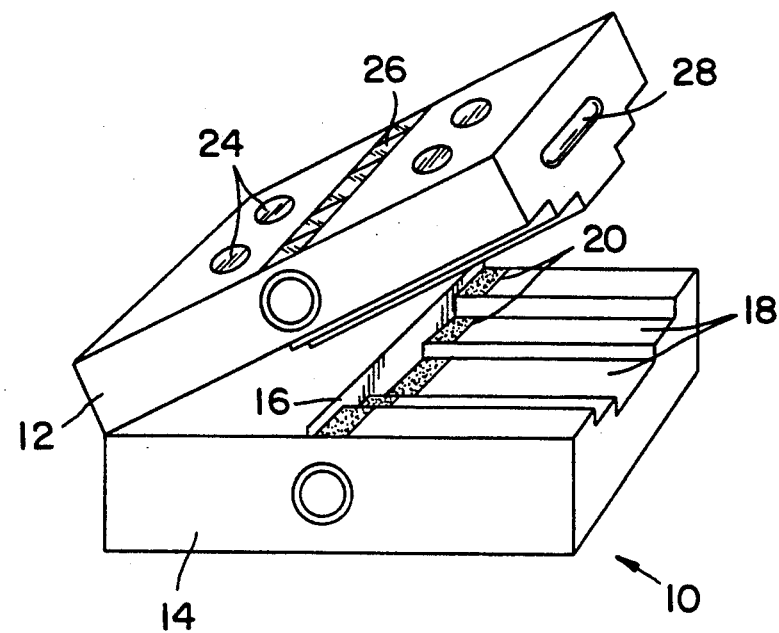
FIG. 1 is a perspective view of a radiograph embosser, incorporating novel features of this invention.
Figure 2:
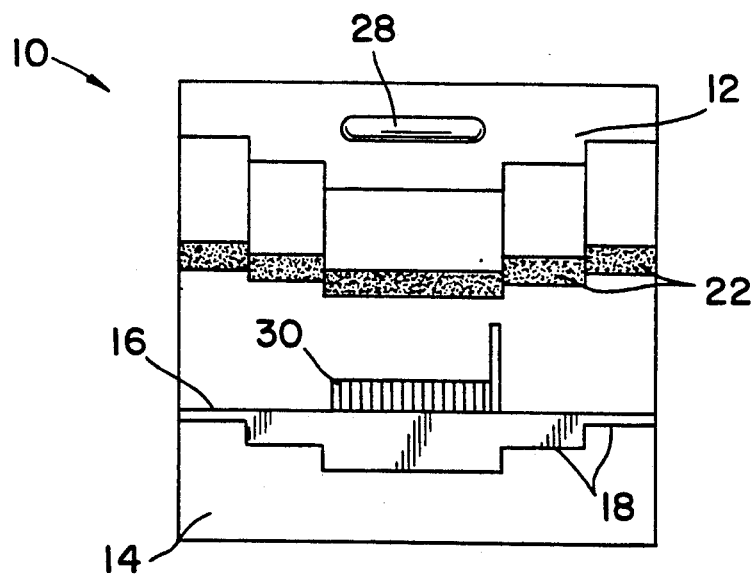
FIG. 2 is a front view of the radiograph embosser of FIG. 1, with the upper member spring urged into an open position.
Figure 3:
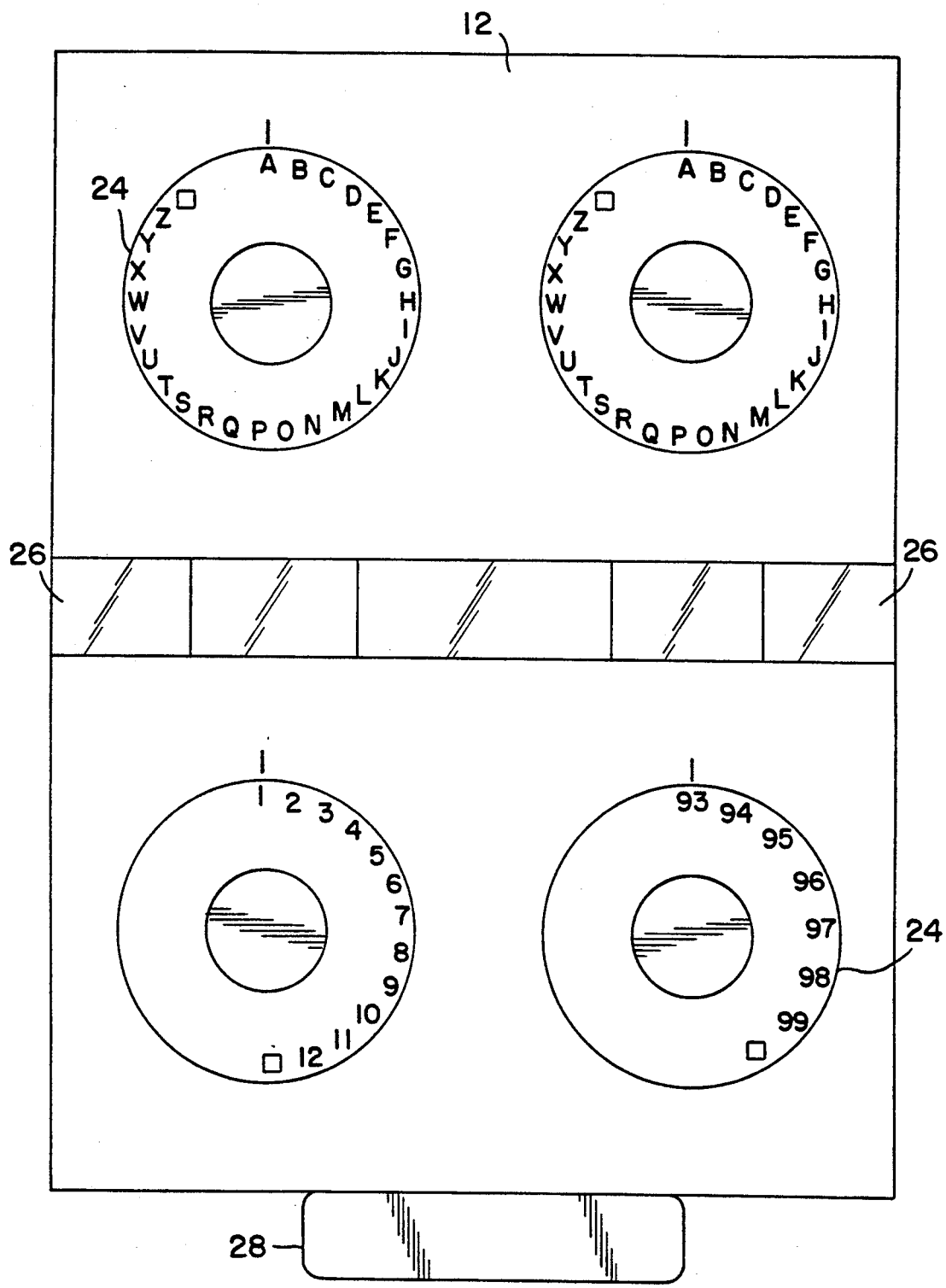
FIG. 3 is an enlarged top view of the upper member of the radiograph embosser of FIG. 1.

Referring now to FIGS. 1 to 3 of the drawings, there is shown the preferred embodiment of a radiograph embossing device 10 whose unique features assist a health practitioner or other office personnel in labeling X-ray films with identifying indicia. The device 10, as clearly seen in FIG. 1, comprises an upper member 12 which is pivotally connected to a lower base member 14. The upper member 12 is biased to an open position with respect to the lower base member 14 by means of a spring 30. The upper member 12 has a number of windows 26 for viewing the films during embossment, and a handle 28 for depressing the upper member 12 into the lower base member 14.

The embossing means itself is integrated into both the upper member 12 and the lower base member 14. As illustrated in FIG. 1, the lower base member 14 has five negative embossing plates 20 which rest on five film guide slots 18 arranged on vertically offset horizontal planes. When the indicia dials 24 on the upper member 12 are rotated, the letters and numbers selected on the dials 24 appear on each of the five negative embossing plates 20 as cavities or indentations. As seen in FIG. 2, the upper member 12 has five positive embossing plates 22 which rest along its bottom surfaces. Likewise, when the indicia dials 24 on the upper member 12 are rotated, the same letters and numbers selected on the dials 24 also appear on each of the five positive embossing plates 22 as protrusions. When the upper member 12 is pivoted so that its lower surfaces come into planar contact with the film guide slots 18 of the lower base member 14, the protrusions on the positive embossing plates 22 mate with the corresponding cavities on the negative embossing plates 20.

Accordingly, the positive embossing plates 22 and the negative embossing plates 20 will always register the same numbers and letters. This is accomplished by having the indicia dials 24 geared to the positive embossing plates 22, and by having the positive embossing plates 22 geared to the negative embossing plates 20. By virtue of this design, when any one of the indicia dials 24 is turned, both the positive embossing plates 22 and the negative embossing plates 20 will simultaneously adjust themselves to the same numbers and/or letters.

The four indicia dials 24 are shown in great detail in FIG. 3. All of the dials 24 are positive positioned so that there is a click in between each setting. Two of the dials 24 have letters for indicating the patient's initials, and the other two dials 24 have numbers for indicating the date of exposure. Each dial 24 has a blank setting (drawn on each dial in FIG. 3 as a small box) for embossing no letter or number. The indicia dials 24 in FIG. 3, as they are positioned in the figure, would select A A (for initials) and 1 93 (for date of exposure) on each of the positive and negative embossing plates 22, 20.

In order to emboss one or more x-ray films, the user of the device 10 first places the x-ray films on the guide slots 18, one film per slot. These film guide slots accept both periapical and bitewing dental films in either the lengthwise or widthwise position. The films may be placed either side up, since there is no conventional way of reading a radiograph with respect to which side of exposure one faces. Once the films are placed on the guide slots 18, the practitioner or staff member slides them one at a time until they reach the film stop 16. By having the guide slots 18 arranged on vertically offset planes, the placing of one film will not interfere with the placing of another. Also, the individual slots 18 allow for consistent centering of embossing information along the edges of the films. Once the films have been slid along the guide slots 18 and positioned adjacent the film stop 16, the user of the embossing device 10 selects the appropriate letters and numbers to mark the films with by turning the indicia dials 24 on the upper member 12. After the correct numbers and letters have been selected, the user of the device 10 grabs the handle 28 and depresses the upper member 12 into the lower base member 14.

When the upper member 12 is pivoted towards the lower member 14, the letter and number protrusions on the positive embossing plates 22 first come into contact with surfaces of the x-ray films, and finally, mate into the corresponding cavities (the negative of the numbers and letters) resting in the negative embossing plates 20, thereby permanently embossing the x-ray films. In this sense, when the upper member 12 has been completely urged onto the lower base member 14, the positive and negative embossing plates 22, 20 come into a full planar contact with each other. When the user releases the upper member 12, it will open due to the action of the spring 30, and the embossed films may be removed. During the procedure, the user of the device 10 may view the films through windows 26 placed along the top surface of the upper member 12.

The embossment letters and numbers are approximately three millimeters in height by two millimeters in width. That is, just large enough to be easily read by the naked eye, but small enough not to interfere with the diagnostic information on the radiograph. The embossments will neither wear off nor be too sensitive to light. The device 10 embosses these characters roughly three millimeters from the edge of the films, thereby allowing them to be placed in an x-ray chart or stored in radiographic film mounts without interference during insertion.

The embossing device 10 is constructed from a plastic or polyvinyl chloride, or from a combination of the two, and is impervious to x-ray film developer, x-ray film fixer, or the emulsion used on the x-ray films. Being relatively small in size and light in weight renders the device 10 portable.

It should be clear that the invention is not limited to the previous descriptions and drawings, which merely illustrate the preferred embodiment. Slight departures may be made within the present scope of the invention. For example, the device 10 may be designed with six indicia dials 24, or with ten film guide slots 18. The linking to a computer keyboard would be accomplished by an electrical cable connecting the embossing device and the keyboard. An electric motor would close the embossing device upon demand and the embossing device would also change wheels by an electric motor connected to both the wheels or dials and the keyboard. The embossing process would result in an identical result but would be electrically operated instead of being operated by hand.

The bottom member would have instead of a set of negative embossing dials, a flat semi-hard plate against which the positive upper member dials would press against with the X-ray film placed in-between the positive upper dials and the semi-hard lower member. This would eliminate the need for lower member embossing dials and obviate the need to have these rotate in conjunction with the upper dials. This would simplify the mechanics of the embossing process. Therefore, the scope of the invention is meant to embrace any and all equivalent apparatus, as well as all design alterations, described in the appended claims.

What is claimed is:

1. An embossing device for use in marking x-ray films with patient identification indicia after said x-ray film has been developed, comprising, an upper member, a lower base member, indicia selection means, and embossing means;

said upper member being pivotally attached to said lower base member, said upper member being spring biased to an open position, said upper member being rotated about an axis upon the application of an adequate force to urge the lower surfaces of said upper member together with and essentially parallel to the upper surfaces of said lower member, said lower member having a plurality of film guiding slots arranged on vertically offset horizontal planes, said lower member having a film stop at one end of said film guiding slots, said indicia selection means disposed on either said upper member or on said lower member, said indicia selection means allowing for the choosing of identifying letters and/or numbers to be placed on said x-ray film by said embossing means, said embossing means including a number of positive embossing plates on the lower surfaces of said upper member, said positive embossing plates registering letters and/or numbers in the form of small protrusions, the number of said positive embossing plates equal to the number of said film guiding slots on said lower base member, said embossing means further including a number of negative embossing plates on said lower base member, said negative embossing plates registering letters and/or numbers in the form of small cavities, the number of said negative embossing plates equal to the number of said positive embossing plates on said upper member, said positive embossing plates and said negative embossing plates arranged so as to be essentially parallel to and thereby mate with one another upon the rotation of said upper member about and together with said lower base member, said positive embossing plates and said negative embossing plates geared together so as to register the same letters and/or numbers chosen with said indicia selection means.

2. An embossing device for use in marking x-ray films with patient identification indicia as recited in claim 1, wherein said upper member has a number of windows for viewing said x-ray film, and whereby the number of said windows equals the number of said film guiding slots on said lower base member.

3. An embossing device for use in marking x-ray films with patient identification indicia as recited in claim 1, whereby said upper member has a handle.

4. An embossing device for use in marking x-ray films with patient identification indicia as recited in claim 1, whereby said indicia selection means is a number of dials disposed on the top surface of said upper member.

5. An embossing device for use in marking x-ray films with patient identification indicia as recited in claim 1, whereby said indicia selection means is four dials disposed on the top surface of said upper member, wherein two of said dials select letters, whereby two of said dials select numbers, and wherein each of said dials has a blank setting corresponding to no letter or number.

6. An embossing device for use in marking x-ray films with patient identification indicia as recited in claim 1, whereby there are five film guiding slots arranged on vertically offset horizontal planes on said lower base member, wherein there are five positive embossing plates, and whereby there are five negative embossing plates.

7. An embossing device for use in marking x-ray films with patient identification indicia as recited in claim 1, wherein there are five windows disposed on said upper member for viewing said x-ray film.

8. An embossing device for use in marking x-ray films with patient identification indicia as recited in claim 1, wherein the plurality of said film guiding slots arranged on vertically offset horizontal planes are of an appropriate size to accept periapical and bitewing dental films either lengthwise or widthwise, and whereby said film guiding slots allow said embossing means to emboss letters and/or numbers three millimeters from the edge of said x-ray film.

9. An embossing device for use in marking x-ray films with patient identification indicia as recited in claim 1, whereby said embossing means embosses letters and numbers three millimeters in height by two millimeters in width on said x-ray film.

10. An embossing device for use in marking x-ray films with patient identification indicia as recited in claim 1, wherein said embossing device is constructed from a plastic or polyvinyl chloride, or from a combination of suitable materials, and whereby said embossing device is impervious to x-ray film developer, x-ray film fixer, or the emulsion used on said x-ray film.

11. An embossing device for use in marking x-ray films with patient identification indicia as recited in claim 1, whereby the outer film guiding slots are elevated higher than the inner film guiding slots.

* * * * *